US010259955B2

(12) United States Patent
Caballero Lopez et al.

(10) Patent No.: US 10,259,955 B2
(45) Date of Patent: Apr. 16, 2019

(54) PIGMENT AND INK FOR THE DECORATION OF CERAMIC OBJECTS

(71) Applicant: Sociedad Anonima Minera Catalano Aragonesa, Saragossa (ES)

(72) Inventors: Miguel Angel Caballero Lopez, Saragossa (ES); Joaquin Javier Perez Aparicio, Saragossa (ES); Sandra Navarro Perez, Saragossa (ES); Silvia Reverter Ibanez, Saragossa (ES)

(73) Assignee: SOCIEDAD ANONIMA MINERA CATALANO ARAGONESA, Saragossa (ES)

( * ) Notice: Subject to any disclaimer, the term of this patent is extended or adjusted under 35 U.S.C. 154(b) by 195 days.

(21) Appl. No.: 15/414,223

(22) Filed: Jan. 24, 2017

(65) Prior Publication Data

US 2017/0218211 A1    Aug. 3, 2017

(30) Foreign Application Priority Data

Jan. 28, 2016  (EP) .................................. 16000202

(51) Int. Cl.
| | |
|---|---|
| *C09D 11/037* | (2014.01) |
| *C09D 11/033* | (2014.01) |
| *C09C 1/00* | (2006.01) |
| *C09C 1/22* | (2006.01) |
| *C04B 35/447* | (2006.01) |
| *C04B 35/626* | (2006.01) |
| *C04B 41/00* | (2006.01) |
| *C04B 41/50* | (2006.01) |
| *C04B 41/86* | (2006.01) |
| *C04B 41/87* | (2006.01) |
| *C04B 41/89* | (2006.01) |
| *C04B 41/52* | (2006.01) |

(52) U.S. Cl.
CPC .......... *C09D 11/037* (2013.01); *C04B 35/447* (2013.01); *C04B 35/6261* (2013.01); *C04B 35/6264* (2013.01); *C04B 41/009* (2013.01); *C04B 41/5022* (2013.01); *C04B 41/5048* (2013.01); *C04B 41/52* (2013.01); *C04B 41/86* (2013.01); *C04B 41/87* (2013.01); *C04B 41/89* (2013.01); *C09C 1/0009* (2013.01); *C09C 1/0081* (2013.01); *C09C 1/22* (2013.01); *C09D 11/033* (2013.01); *C01P 2004/61* (2013.01); *C01P 2004/62* (2013.01)

(58) Field of Classification Search
None
See application file for complete search history.

(56) References Cited

U.S. PATENT DOCUMENTS

| | | | | |
|---|---|---|---|---|
| 6,908,600 | B2* | 6/2005 | Ambri | C03C 1/006 |
| | | | | 106/453 |
| 9,512,031 | B2* | 12/2016 | Madrigal Villegas | |
| | | | | C04B 41/5022 |
| 9,765,228 | B2* | 9/2017 | Aparisi Ventura | C09D 11/322 |
| 9,908,819 | B1* | 3/2018 | Kollenberg | B82Y 30/00 |
| 2009/0311538 | A1* | 12/2009 | Long | C03C 3/083 |
| | | | | 428/432 |
| 2013/0265376 | A1* | 10/2013 | Gil-Torrente | C09D 11/30 |
| | | | | 347/102 |
| 2015/0291841 | A1* | 10/2015 | Fores Fernandes | |
| | | | | B41M 5/0047 |
| | | | | 524/606 |
| 2017/0217845 | A1* | 8/2017 | Caballero Lopez | C03C 8/00 |

FOREIGN PATENT DOCUMENTS

| | | |
|---|---|---|
| EP | 1272574 A1 | 1/2003 |
| EP | 2000443 A1 * | 12/2008 |
| EP | 2562144 A2 * | 2/2013 |
| ES | 2131466 A1 | 7/1999 |
| ES | 2246166 A1 | 2/2006 |
| ES | 2289916 A1 | 2/2008 |

OTHER PUBLICATIONS

EPO Search Report dated Jul. 20, 2016 for EP 16000202; 2 pages.*
EPO Written Opinion dated Jul. 20, 2016 for EP 16000202; 3 pages.*

* cited by examiner

*Primary Examiner* — Helene Klemanski
(74) *Attorney, Agent, or Firm* — Notaro, Michalos & Zaccaria P.C.

(57) ABSTRACT

Pigments and inks for the decoration of ceramic objects, which have, in their formulation, iron and phosphorus oxides, combined with lithium oxide, the presence of this latter element being that which gives the pigments the capacity of being milled (in the form of a suspension in a solvent base) to the point of being able to obtain inks that are characterized by having very narrow PSD and an upper bound of less than 1 µm. Thanks to this PSD, inks prepared using these pigments can be applied in standard printing heads to glazed ceramic objects, enabling a metallic gloss and appearance to be obtained after said ceramic objects undergo a firing process. The ink obtain has a low viscosity, allowing an increase in the concentration of the pigment and thus an increase in its yield, optimizing gloss and the metallic appearance of the finished ceramic objects.

4 Claims, 3 Drawing Sheets

PIGMENT AND INK FOR THE DECORATION OF CERAMIC OBJECTS

TECHNICAL AREA

The present invention comes within the field of materials for the ceramics industry, in particular, calcined pigments and inks with metallic effects intended for application in the industrial ceramics industry both for ceramic tiles and structural and sanitary ceramics, for the purpose of obtaining a metallic gloss or metallic appearance.

Definitions

The particle size distribution (PSD), either of a powder, a granular product or particles dispersed in a liquid, is a series of values that defines the relative amount, typically by mass or volume, of the particles present, ordered according to their size.

d(v,n), generally expressed as Dn, is a collection of parameters that allows a PSD to be characterised and it is defined as the equivalent diameter of a particle such that an amount n (expressed on a per unit basis) of the volume of the control sample has an equivalent diameter that is less than the said value. For example: d(v,0.50), also expressed as D50 would correspond to the median of the PSD.

Distribution width, WPSD is a value which gives us a measurement of the degree of spread of data around the median. It is calculated according to the following expression:

$$W_{PSD} = \frac{d(v, 0.90) - d(v, 0.10)}{d(v, 0.50)} \quad (1)$$

d(v, 0.97), also expressed as D97, is the parameter that is normally used as the upper bound of the PSD of suspensions and powders.

Metallic appearance (gloss). It is a quality or effect of materials, characterised by the fact that both the gloss and colour of the materials vary according to the angle of view, so that the human eye associates them with a metallic product (without them necessarily having an atomic structure based on metal bonds). That is, it is an optical appearance that is not always related to the chemical or structural composition of the product. A typical example of materials with a metallic appearance, without them really being so, is car paints and coatings of numerous household objects normally made of plastic.

Given that it is a visual appearance effect it is not easy to express it in numerical terms. Even so, since metallic appearance is related to changes in colour and gloss depending on the angle of view, it is possible to establish a measurement of said metallic appearance based on optical measurements according to the angle. Various proposals for estimating metallic appearance can be found in the literature. For example, equation 2 is commonly used in the car industry.

$$FI = 2.69 \frac{(L^*_{15°} - L^*_{110°})^{1.11}}{L^{*\,0.86}_{45°}} \quad (2)$$

Where $L_{15°}^*$, $L_{45°}^*$ and $L_{110°}^*$ are the luminosity values determined with a multi-angle spectrophotometer colorimeter.

Metallic effects in ceramics have been known for hundreds of years and different techniques have been used to obtain them, ranging from thermal reduction treatments, the suspension of particles of noble metal in ceramic glazes, lead silicate glazes with high concentrations of transition metal oxides in their composition, and inks containing crystalline flat pigments (similar to those used in car paints). Except in the last case, in which the metallic effect is based on the application of coats containing reflective laminar pigments, in general in ceramics metallic effects are due to the presence of high-reflectivity devitrified micro-crystals in the glaze during the corresponding thermal treatment, which generate gloss variations depending on the angle, with high-intensity peaks at intermediate angles (60°). Furthermore, it must be added in this case that the metallic gloss decoration is applied over a glaze that may be matt or gloss, affecting the gloss measurements of the ink coating. For this reason, in this case, a metallic appearance index $\theta_M$ has been estimated, based on gloss measurements determined with a standard multi-angle glossmeter, according to equation 3:

$$\theta_M = \theta_{60°} - \theta_{85°} \quad (3)$$

Where $\theta_{60°}$ and $\theta_{85°}$ are the gloss values of the coating at the corresponding angles.

The greater the metallic appearance of the surface measured is, the higher and more positive the values of this parameter are.

Resolution. In inkjet terminology, this term refers to the definition obtained in printing, that is, the number of dots printed per unit of length, usually expressed in dots per inch (dpi). Most of the printing heads used in ceramic decoration have a resolution capacity of between 360 and 400 dpi.

PRIOR ART

The technique of tile decoration by digital printing using inkjet machines has become common practice as it is an economical, highly flexible process. It is usually employed to decorate ceramic tiles by means of the application of pigmented inks, which give the tiles their colour once they are fired.

Initially, the inks that were used were soluble salts of metal cations dissolved in different types of organic solvents (isoparaffins, glycols, etc.), normally of an apolar nature, in order to prevent problems of short-circuits in the heads, such as those referred to in EP 1 272 574 "Individual inks and set of inks for use in colour inkjet printing of glazed ceramic articles and surfaces". However, given that these inks are applied over unfired glazes, that is to say, these are porous substrates, the use of soluble salts caused serious problems of printing reproducibility due to the difficulty of controlling the penetration of the inks in the substrate.

The problem of uncontrolled ink penetration was later minimized when soluble salts were replaced by solid pigments of a ceramic nature, which penetrate porous substrates much less easily than soluble salts. Thus, suspensions of pigments in a solvent medium are prepared, which are subsequently milled to obtain a particle size distribution (PSD) that is small enough to be used in the printing heads that are commonly employed in ceramics. In general, the specifications for most printing heads (determined by the injectors) require the use of inks with a PSD of solids that is limited in its upper bound. Most printing heads restrict use to inks with D97<1 µm and there are only a few printing heads whose limit for inks is D97<3 µm.

However, it is not only important to limit the upper bound of the PSD of ink suspensions. It is also essential to prevent the formation of an excess of fine grains of pigment since, because the specific surface area of the solid varies in a ratio that is inversely proportional to the diameter of the particles, when the specific surface area increases excessively, a re-aggregation of particles may occur. Thus, having inks with a PSD that has a very small width improves their stability over time (by preventing re-aggregation) and allows higher concentrations of pigment to be reached.

Different procedures relating to ceramic ink printing can be found in the prior art, such as for example, Patent ES 2 131 466 "Automatic procedure for decorating ceramic substrates", which describes, in general terms, the use of the inkjet system in ceramics and also Patent ES 2 289 916 "Colloidal dispersion of ceramic pigments", which presents, in very general terms, the manufacture of inks for inkjet application. These procedures and inks can only produce finishes in different colours by injection, but it is not possible to obtain a finish with a metallic appearance.

Furthermore, obtaining metallic finishes is associated conventionally with the use of special glazes that are quite thick, such as that described in Patent ES 2 246 166 "Metallic glaze composition", that creates a sufficiently thick metallised base over which the desired colour decoration can be subsequently applied. This procedure has the drawback that the metallised glaze has to be applied over the whole of the tile surface. If, in addition, the tile is going to be decorated with coloured inks, an intermediate, very opaque white glaze layer has to be incorporated in the areas to be decorated in order to prevent the chemical reaction that occurs between the metallic glaze and the decoration from distorting and dulling the colours. This logically involves a higher economic cost and waste of materials. Furthermore, this technique requires a very thick coat that cannot be obtained using high-resolution (300-400 dpi) printing heads that are commonly employed for inkjet ceramic decoration. In fact, metallic effects are mainly used by applying layers of glaze with a weight per surface area unit of between 300 and 500 g/m$^2$ of solid, by waterfall, airbrush or disc application. However, a high-resolution injection head can only supply a weight of between 6-75 g/m$^2$ of applied solid, which is much less than that required. Hence, it is not considered a priori technically possible to obtain metallic effects in ceramic tiles by inkjet.

DESCRIPTION OF THE INVENTION

The present invention relates to a ceramic pigment used to manufacture ink, which results in a gloss or metallic appearance being obtained when it is used in a process for decorating ceramic objects, consisting of the following phases:
Glazing of the ceramic product.
Inkjet decoration (by injection of ink) using the ink of the invention.
Completion with a conventional firing process.

The present invention thus relates, firstly to a ceramic pigment characterised in that it comprises, as essential oxides in its formulation: phosphorus oxide and iron oxide as precursors of the devitrification of the crystals responsible for obtaining the metallic gloss and lithium oxide as a modifier of the structure of the pigment, which allows its milling to be improved. Furthermore, the pigment may contain other minority oxides to modify its properties of fusibility and crystal growth It has been determined that, in comparison to the behaviour of the standard iron (III) phosphate pigment, whose original formula is $FePO_4$ (or $Fe_2O_3.P_2O_5$ in ceramic notation), an iron phosphate and lithium pigment, hereafter P—Fe—Li pigment, is much easier to mill (in the process of preparing the ink as a suspension in a solvent base), precisely due to the fact that it includes lithium oxide in its composition.

A second object of the present invention is the ink prepared by milling based on the previously mentioned P—Fe—Li pigment whose formula consists of a solid part, corresponding to the P—Fe—Li pigment, a dispersant and a solvent part.

Advantages of the Invention

The incorporation of lithium oxide $Li_2O$ in the pigment formula, in a certain concentration, leads, surprisingly, to a spectacular reduction in ink milling times. This reduction in time means that a much narrower PSD can be obtained, that is to say, one with a smaller width value. This means that the ink will have a much lower concentration of fine particles, which will prevent: the tendency of the ink to re-aggregate, caking of the solid component and, thus, loss of filterability (which can be determined as the filtering speed, ink flow, at a certain pressure, usually 2 bar, through a standard Teflon filter with a pore diameter of 5 µm).

Furthermore, the new pigment of this invention improves the state of the art, as the technical problem of the limited filtering capacity of the current iron phosphate is overcome, milling efficiency is improved, reducing the time required to reach the target PSD and ink viscosity is reduced, which allows the concentration of pigment in the ink to be increased, optimizing the end result. Hence, in conclusion, tiles or ceramic objects in general, decorated with these more concentrated inks have improved optical properties in terms of their metallic appearance (gloss).

DESCRIPTION OF THE FIGURES

To gain a better understanding of the present invention, FIG. 1 of the attached drawing shows a graph of the relationship between the lithium content of the pigment (expressed as [x+y] in formula 4) and the PSD of the ink milling.

PREFERRED EMBODIMENT OF THE INVENTION

Figure 1:
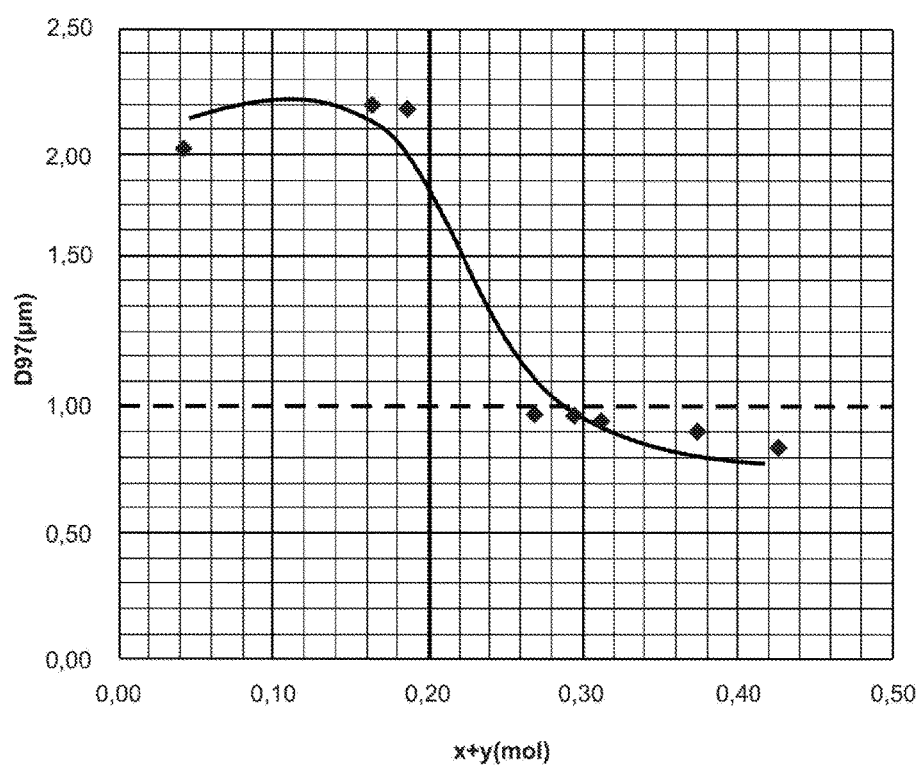

The present invention relates to a ceramic pigment used to manufacture ink, which results in a gloss or metallic appearance being obtained when it is used in a process for decorating ceramic objects, consisting of the following phases:
Glazing of the ceramic product.
Inkjet decoration using the ink of the invention.
Completion with a conventional firing process.

The present invention thus relates, firstly to a ceramic pigment characterised in that it comprises, as essential oxides in its formulation: phosphorus oxide and iron oxide as precursors of the devitrification of the crystals responsible for obtaining the metallic gloss and lithium oxide as a modifier of the structure of the pigment, which allows its milling to be improved. Furthermore, the pigment may contain other minority oxides to modify its properties of fusibility and crystal growth It has been determined that in comparison to the behaviour of the standard iron (III) phosphate pigment, whose original formula is $FePO_4$ (or $Fe_2O_3.P_2O_5$ in ceramic notation), it is much easier to mill (in the process of preparing the ink as a suspension in a solvent base) a new pigment that includes lithium oxide in its chemical composition, according to formula (4), expressed in moles:

$$(1-x)Fe_2O_3.(1-y)P_2O_5.(x+y)Li_2O \qquad (4)$$

Where:

x is between −0.10 and 0.30.

y is between −0.10 and 0.30.

The sum of x and y is between 0.20 and 0.60.

Indeed, the incorporation of lithium oxide $Li_2O$ in the formula of the new P—Fe—Li pigment, according to formula (4), based on a certain concentration (expressed as: x+F≥0.20 moles) surprisingly leads to a spectacular reduction in the milling time of inks. This reduction in time means that a much narrower PSD can be obtained, that is to say, one with a smaller width value. This means that the ink will have a much lower concentration of fine particles, which will prevent: the tendency of the ink to re-aggregate, caking of the solid component and, thus, loss of filterability (which can be determined as the filtering speed, ink flow, at a certain pressure, usually 2 bar, through a standard Teflon filter with a pore diameter of 5 μm).

Hence, with the new P—Fe—Li pigment of the invention, the state of the art is improved by overcoming the technical problem of the limited filtering capacity of the current iron phosphate inks, milling efficiency is improved, reducing the time required to reach the target PSD and a reduction in ink viscosity is obtained, which allows the concentration of pigment in the ink to be increased and the end result to be optimized. Hence, in conclusion, tiles or ceramic objects in general, decorated with this more concentrated ink have improved optical properties in terms of their metallic appearance (gloss).

In addition to the three essential oxides, the composition of the P—Fe—Li pigment may contain other minority oxides, $SiO_2$, $SnO_2$, $Al_2O_3$, $Na_2O$, $K_2O$, MgO or CaO, added to the formula (4) always with a total content (expressed as the sum of the said oxides) of less than 0.10 moles.

A second object of the present invention is the ink prepared by milling, based on the aforementioned P—Fe—Li pigment whose formula comprises a solid part, corresponding to P—Fe—Li, a dispersant and a solvent part (in which the solvents may be selected from among glycols, isoparaffinic hydrocarbons and carboxylic esters), according to the following composition expressed in % by weight, Table 1:

Due to the special formulation of the pigment, in a preferred embodiment, the milled ink has an ink particle size distribution determined for a value D97<3 μm, so that it can be used in DIMATIX 1024L, XAAR 1002 GS 40 or SEIKO RC 1536 printing heads, amongst others, that allow ink of up to 3 μm in size to be used.

In an especially preferred embodiment, the milled ink has a PSD that is characterised by having a value of D97<1 μm, which makes it apt for all types of printing heads among those used for decorating ceramic products.

In so far as the process of decoration of ceramic objects is concerned:

The phase of glazing over a ceramic base is carried out by means of a process chosen from amongst the group formed by: bell, airbrush, rotary, disc or waterfall.

The phase of decorating with the metallic ink is preferably carried out using an injection head of those commonly used in ceramic decoration.

The firing phase is carried out by means of a normal ceramic cycle, ranging from traditional double firing at 900° C. to high-temperature porcelain stoneware firing at 1300° C.

EXAMPLES

Example 1. Relationship Between the Pigment Formulation and the PSD Obtained Using mixtures of the raw materials: monoammonium phosphate, lithium carbonate and iron oxide (selected from among the different alternatives that afford the oxides $P_2O_5$, $Li_2O$ and $Fe_2O_3$), Pigments P1 to P8 were prepared with the chemical compositions indicated in Table 2, expressed in a molar formula, based on which the x and y coefficients were determined, and according to formula (4).

These mixtures, P1 to P8 were calcined at 860°, with a residence time of 2 hours at maximum temperature to give rise to the corresponding pigments.

Subsequently, inks were prepared by milling for a set time (240 min) in a laboratory batch mill, using 0.3-0.4 mm diameter Zr—Y balls as the milling material and using for this purpose the formula of Table 3. After milling, the PSD of the inks was measured by laser diffraction, determining the D97 values that are indicated at the end of Table 2.

TABLE 1

Formulation of pigments P1 to P8 and PSD (D97) obtained after milling

|  | P1 | P2 | P3 | P4 | P5 | P6 | P7 | P8 |
|---|---|---|---|---|---|---|---|---|
| $Fe_2O_3$ | 1.04 | 0.91 | 0.92 | 0.84 | 0.79 | 0.85 | 0.87 | 0.81 |
| $P_2O_5$ | 0.92 | 0.91 | 0.92 | 0.84 | 0.79 | 0.85 | 0.86 | 0.81 |
| $Li_2O$ | 0.04 | 0.18 | 0.16 | 0.32 | 0.42 | 0.30 | 0.27 | 0.38 |
| x | −0.04 | 0.09 | 0.08 | 0.16 | 0.21 | 0.15 | 0.13 | 0.19 |
| y | 0.08 | 0.09 | 0.08 | 0.16 | 0.21 | 0.15 | 0.14 | 0.19 |
| x + y | 0.04 | 0.18 | 0.16 | 0.32 | 0.42 | 0.30 | 0.27 | 0.38 |
| D97 | 2.02 | 2.18 | 2.20 | 0.94 | 0.83 | 0.96 | 0.97 | 0.90 |

TABLE 1

Range of ink compositions

| Component | % (by weight) |
|---|---|
| P—Fe—Li pigment | 25-50 |
| Dispersant | 1-15 |
| Solvent | 35-74 |

TABLE 3

Ink formula

| Component | Weight (g) |
|---|---|
| Pigment | 48 |
| Dispersant | 12 |
| Solvent | 60 |

Based on the data in Table 2, the D97 values are shown in relation to the sum of factors x and y, obtaining the graph shown in FIG. 1, in which it can be seen that when the sum of the x and y parameters reaches a value of more than 0.20 there is a spectacular reduction in the particle size, obtaining a grain size of D97<1, which is suitable for the use of the inks in the standard printing heads used for ceramic decoration. It is thus, surprisingly, the concentration of lithium in the pigment which permits said reduction in size.

Example 2. Ink Milling in a Continuous Mill

In order to determine the effect of incorporating lithium in the pigment, using it in a mill that is scalable to production, 4 milling operations were prepared in a continuous mill with recirculation, Table 4, carried out in each case with 0.3-0.4 mm diameter Ce Y balls. The first two milling operations, M1 and M2 were performed with a standard pure iron phosphate pigment, without the incorporation of lithium (that is to say, with x=0 and y=0 in the formula (4)).

TABLE 2

Composition of the pigments and the inks from milling operations in a continuous mill.

| | M1 | M2 | M3 | M4 |
|---|---|---|---|---|
| Pigment parameters (according to formula 4) | | | | |
| x | 0.00 | 0.00 | 0.00 | 0.00 |
| y | 0.00 | 0.00 | 0.20 | 0.20 |
| Ink formula (% by weight) | | | | |
| Pigment | 38 | 34 | 38 | 38 |
| Dispersant | 10 | 10 | 10 | 8 |
| Solvent | 52 | 56 | 52 | 54 |

For the four milling operations data were taken in terms of time, both that of the PSD (D97 [μm]) and that of specific energy consumption in relation to the weight of the milled pigment (W/M [kWh/kg]).

Figure 2:
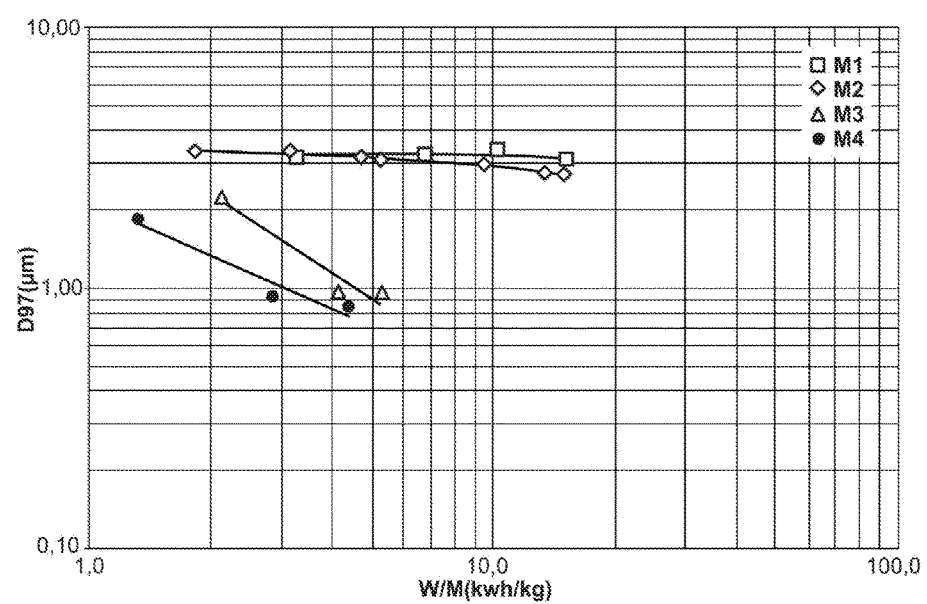
FIG. 2 shows a graph of the evolution in the PSD (D97) of the ink in relation to specific work consumed for the 4 milling operations.

As can be seen in the graph in FIG. 2, the target of D97<1 μm was not achieved with either of the two milling operations, M1 and M2, that were performed using the standard iron phosphate pigment without lithium, although it was felt that it could be achieved with a reduction of the concentration of the pigment in the ink, albeit with an extraordinarily high specific consumption. This is because iron phosphate pigments prepared by thermal calcination acquire a laminar structure so that it is extremely complicated to mill them as inks: as can be seen, the milling times increase and the particle size distribution of the final ink is limited to a great extent, and this conditions the use of the ink. Indeed, after a long milling process, the particle distribution parameter D97<3 μm is barely reached, which obliges non-standard printing heads to be used. Moreover, given the laminar structure of the pigments, the inks have a very limited filtering capacity so that problems may occur with the printing heads.

However, in the M3 milling operation, prepared with P—Fe—Li pigment, in this case with x=0.0 and y=0.2, the pursued objective was achieved. In order to determine if the concentration of dispersant was suitable, a fourth milling operation, M4, was performed using the same P—Fe—Li pigment and a lower concentration of dispersant (see Table 4), resulting in even more effective milling and the target being attained with a specific consumption of 2.9 kWh/kg of pigment.

Example 3. Manufacture of Ceramic Tiles with Metallic Gloss Decorated Using an Ink with P—Fe—Li Pigment Ceramic porcelain stoneware paving tiles were glazed using a glaze with a composition suited for their use, with a weight of approximately 350 g/m². Subsequently, the M4 ink was applied over them using a DIMATIX 1024 L printing head for this purpose, with a design resolution of 1200 dpi and obtaining a weight of applied ink (per surface area unit) of approximately 55 g/m².

Figure 3:
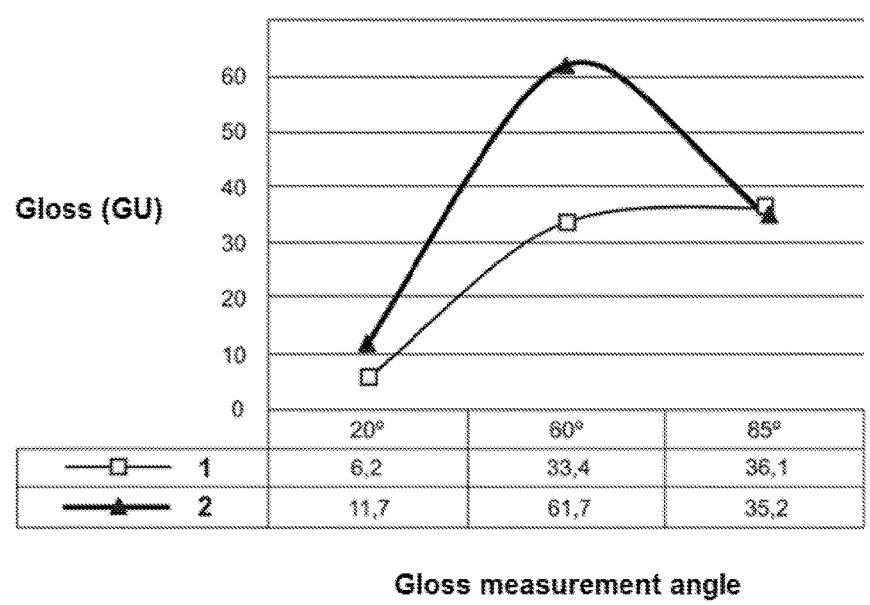
FIG. 3 shows a graph of the variation in gloss depending on the angle, for the bottom glaze (1) and metallic ink (2).

After firing in a standard porcelain stoneware single-firing cycle at 1200° C., the tiles were found to have a perfectly metallised appearance. To quantify the metallic appearance using a multi-angle glossmeter, the gloss of the tiles was measured at different angles, FIG. 3, both in the zone with glaze only (1) and in the part decorated with ink (2). As can be seen in the graph in FIG. 3, there is a notable increase in gloss at 60° in the zone to which ink is applied due to the appearance of the metallic effect. Based on the data in the table, the metallic gloss index of the zone decorated with ink (2) was determined according to equation 3, giving a value of:

$$\theta_M = 61.7 - 35.2 = 26.5 \, UB$$

which indicates an increase in gloss due to the metallic effect of 26.5 Gloss Units, in contrast to the lack of increase in gloss on the non-decorated (glaze only) zone, whose metallic gloss index value would be:

$$\theta_M = 33.4 - 36.1 = -2.7 \, UB$$

All of the information referring to examples or embodiments, including the tables, form part of the description of the invention. A technical expert will easily comprehend that the characteristics of different embodiments can be combined with the characteristics of other possible embodiments provided that the combination is technically possible, such as for example, the combination of the M3 formula of table 4, used for milling the pigment as ink, with x=0.0 and y=0.2, but with a different pigment, such as P5 from table 2 (with x=0.21 and y=0.21) which optimizes the speed of milling, or even with any other that is within the range of the general formula of the pigment (formula-4-) such as that which could be obtained by taking the x=−0.1 and y=0.3 values, which permits a maximum concentration of Fe₂O (1.10) within the range that the formula defines.

The invention claimed is:
1. Ceramic pigment used for the decoration of ceramic objects, wherein it comprises, as essential oxides in its formulation: phosphorus oxide and iron oxide as precursors of the devitrification of the crystals responsible for obtaining the metallic gloss and lithium oxide as a modifier of the structure of the pigment and an improver of its milling, characterised in that the incorporation of lithium oxide in the iron phosphate is carried out according to the formula, expressed in moles:

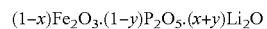

$(1-x)Fe_2O_3 \cdot (1-y)P_2O_5 \cdot (x+y)Li_2O$ where:
x is between −0.10 and 0.30,
y is between −0.10 and 0.30 and
the sum of x and y is between 0.20 and 0.60.
2. Ceramic pigment, according to claim 1, wherein it contains, in addition to the three essential oxides, one or several minority oxides, chosen from the group formed by $SiO_2$, $SnO_2$, $Al_2O_3$, $Na_2O$, $K_2O$, MgO and CaO, added in a total content expressed as the sum of the said oxides, of less than 0.10 moles.

3. Ink prepared by milling, based on a pigment as described in claim 1, wherein its formula consists of a solid part in a proportion of between 25% and 50% by weight, corresponding to P—Fe—Li pigment, a dispersant in a proportion of between 1% and 15% by weight, and a solvent part, in a proportion of between 35% and 74% by weight.

4. Ink, according to claim 3, wherein the solvents are chosen from the group formed by glycols, isoparaffinic hydrocarbons and carboxylic esters.

* * * * *